United States Patent
Denner et al.

(10) Patent No.: US 7,988,002 B2
(45) Date of Patent: Aug. 2, 2011

(54) PLASTIC CONTAINER AND CLOSURE AND SYSTEM AND METHOD OF MAKING THE SAME

(75) Inventors: John E. Denner, York, PA (US); David B. Clements, Medina, OH (US); Robert D. Stoolmaker, York, PA (US)

(73) Assignee: Graham Packaging Company, L.P., York, PA (US)

( * ) Notice: Subject to any disclaimer, the term of this patent is extended or adjusted under 35 U.S.C. 154(b) by 512 days.

(21) Appl. No.: 11/979,730

(22) Filed: Nov. 7, 2007

(65) Prior Publication Data

US 2008/0128380 A1 Jun. 5, 2008

Related U.S. Application Data (60) Provisional application No. 60/857,117, filed on Nov. 7, 2006.

(51) Int. Cl.
*B65D 5/72* (2006.01)
(52) U.S. Cl. .............. 215/44; 215/40; 215/43; 222/111; 222/129; 222/143; 222/465.1; 222/571
(58) Field of Classification Search ............... 215/40, 215/43, 44; 222/111, 129, 143, 465.1, 571, 222/83.5
See application file for complete search history.

(56) References Cited

U.S. PATENT DOCUMENTS

| | | | |
|---|---|---|---|
| 2,207,210 A * | 7/1940 | Von Knauf | 220/799 |
| 2,487,400 A | 11/1949 | Tupper | |
| 2,756,793 A | 7/1956 | Tupper | |
| 2,789,607 A | 4/1957 | Tupper | |
| 2,789,608 A | 4/1957 | Tupper | |
| 2,880,859 A | 4/1959 | Tupper | |
| 2,885,103 A * | 5/1959 | Cunningham, Jr. | 414/704 |

(Continued)

FOREIGN PATENT DOCUMENTS

WO    WO 00/27725    5/2000

(Continued)

OTHER PUBLICATIONS

International Search Report dated Jun. 5, 2008.

*Primary Examiner* — Anthony Stashick
*Assistant Examiner* — Cynthia F Collado
(74) *Attorney, Agent, or Firm* — Miles & Stockbridge P.C.; James T. Carmichael; Michael A. Minter (57) ABSTRACT

A plastic container and closure and method of making the same. The container can include a solid bottom end, an outer sidewall extending from the solid bottom end, and a neck portion extending from the outer sidewall to create an open end of the container. The neck portion may have a spout portion having an aperture formed therein. The spout portion can be inverted to form a flange receptacle. The closure can include a sealing portion which includes a first receptacle, a spring portion that includes a second receptacle, and a planar center area configured in the center of the closure and extending inward from the spring portion. The container may be filled with a product and the closure secured to the container, over the open end, to create a primary seal and a secondary seal. When the closure is secured to the container, the spring portion can exert a sealing pressure against the neck portion of the container to create the primary seal.

6 Claims, 13 Drawing Sheets

U.S. PATENT DOCUMENTS

| | | | |
|---|---|---|---|
| 2,885,108 A * | 5/1959 | Donoghue | 220/798 |
| 2,892,540 A | 6/1959 | Tupper | |
| 2,901,098 A | 8/1959 | Tupper | |
| 2,941,660 A | 6/1960 | Tupper | |
| 3,044,610 A | 7/1962 | Tupper | |
| 3,744,671 A * | 7/1973 | Saunders, Jr. | 220/698 |
| 3,817,420 A * | 6/1974 | Heisler | 220/790 |
| 3,817,428 A * | 6/1974 | Buckley | 222/173 |
| 3,913,785 A * | 10/1975 | Pattershall | 220/733 |
| 4,201,311 A | 5/1980 | Underwood | |
| 4,471,880 A | 9/1984 | Taylor et al. | |
| 4,619,373 A | 10/1986 | Galer | |
| 4,718,571 A | 1/1988 | Bordner | |
| 4,928,846 A * | 5/1990 | Murrin, Jr. | 220/797 |
| 4,933,133 A | 6/1990 | Brown et al. | |
| 5,425,467 A | 6/1995 | Feer et al. | |
| 5,458,252 A | 10/1995 | Logel | |
| 5,460,287 A | 10/1995 | Cargile et al. | |
| 5,505,326 A | 4/1996 | Junko | |
| 6,412,661 B1 | 7/2002 | Hannah, Sr. | |
| 6,530,500 B2 * | 3/2003 | Bravo et al. | 222/143 |
| 6,619,498 B2 | 9/2003 | von Holdt, Jr. | |
| 6,843,389 B2 | 1/2005 | Kasting et al. | |
| 6,854,617 B2 | 2/2005 | Taylor et al. | |
| 6,929,145 B2 | 8/2005 | Shelper | |
| 6,959,829 B2 * | 11/2005 | Crider et al. | 220/276 |
| 6,983,862 B2 | 1/2006 | Nottingham et al. | |
| 7,036,693 B2 | 5/2006 | Walsh et al. | |
| 7,040,509 B2 | 5/2006 | McLelland et al. | |
| 7,074,443 B2 | 7/2006 | Thomas et al. | |
| 7,086,551 B2 | 8/2006 | von Holdt, Jr. | |
| 7,090,088 B2 * | 8/2006 | von Holdt, Jr. | 220/276 |
| 7,108,149 B2 | 9/2006 | Taylor et al. | |
| 7,156,265 B2 | 1/2007 | Walsh et al. | |
| 7,169,418 B2 | 1/2007 | Dalton et al. | |
| 7,175,051 B2 | 2/2007 | McLelland et al. | |
| 7,216,779 B2 | 5/2007 | Kasting et al. | |
| 7,225,945 B2 | 6/2007 | Crider et al. | |
| 7,325,968 B2 * | 2/2008 | Huckby et al. | 366/209 |
| 7,434,706 B2 * | 10/2008 | Nottingham et al. | 222/109 |
| 7,520,410 B2 * | 4/2009 | Gilbertson et al. | 222/542 |
| 2006/0163252 A1 * | 7/2006 | Zalewski | 220/254.3 |
| 2006/0231985 A1 | 10/2006 | Kelley | |
| 2007/0187413 A1 * | 8/2007 | Gruskin et al. | 220/500 |

FOREIGN PATENT DOCUMENTS

WO    WO 2004/046013 A2    6/2004

* cited by examiner

PLASTIC CONTAINER AND CLOSURE AND SYSTEM AND METHOD OF MAKING THE SAME

This application claims the benefit of U.S. Provisional Application No. 60/857,117, filed Nov. 7, 2006.

The present invention relates generally to a plastic container and closure and system and method of making the same.

DETAILED DESCRIPTION

Embodiments are directed generally to a plastic container and closure and method of making the same. In particular, various embodiments can comprise forming a container by forcing a gas into the container via an aperture in the container, wherein the formed container has a solid bottom end, an outer sidewall extending from the solid bottom end, and a neck portion extending from the outer sidewall to create an open end of the container. In various embodiments, the neck portion may have a diameter less than a diameter of the outer sidewall. Additionally, the neck portion may have a spout portion having the aperture formed therein. The spout portion may be inverted to form a flange receptacle. In various embodiments, the flange receptacle may have a free end that extends inward from the neck portion to a position below the open end of the container. In various embodiments, the flange receptacle includes the aperture, with the aperture also being below the open end of the container. Also, in its inverted position, the flange receptacle can be entirely contained within the interior of the container. Various embodiments also include forming a closure having a sealing portion which includes an outer portion and an inner portion that form a first receptacle, a spring portion that includes a second receptacle, and a planar center area configured in the center of the closure and extending inward from the spring portion. In various embodiments, the outer portion of the sealing portion has a diameter greater than the diameter of the neck portion of the container and the inner portion has a diameter less than the diameter of the neck portion of the container. Additionally, in various embodiments, the spring portion extends inward from the sealing portion. After the container is formed, the container may be filled with a product and the closure secured to the container, over the open end, to create a primary seal and a secondary seal. In various embodiments, when the closure is secured to the container the spring portion can exert a sealing pressure against an interior side of the neck portion of the container to create the primary seal, and the second receptacle can face toward the solid bottom end of the container.

Figure 1:
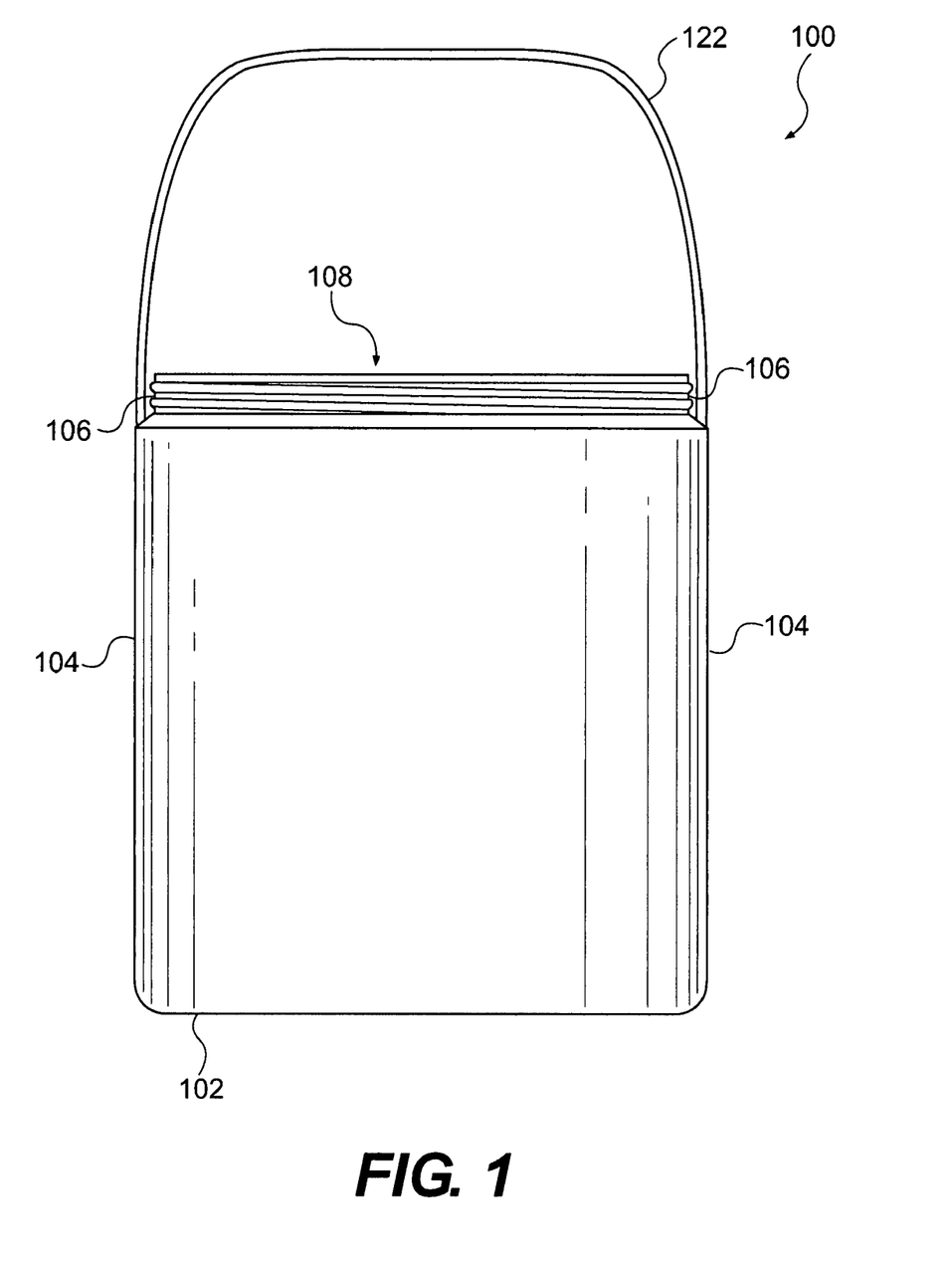
FIG. 1 is a side view of a container according to various embodiments.

FIG. 1 shows a side view of a container 100 according to various embodiments. Container 100 can be any suitable size and shape. For example, container 100 can be cylindrical, cube-shaped, rectangular, etc. Moreover, container 100 can comprise any suitable material. For example, container 100 can comprise one or more plastics or combinations thereof, the plastics including, but not limited to, polyethylene terephthalate (PET), low density polyethylene (LDPE), high density polyethylene (HDPE), and nylons, as well as other polyesters, polyolefins, and polycarboxyamides having suitable properties for the intended application. Container 100 can be made by any suitable process or method, including, but not limited to blow molding, injection molding, and extrusion blow molding. U.S. Pat. No. 4,933,133 provides an example of a method of manufacture.

Figure 2:
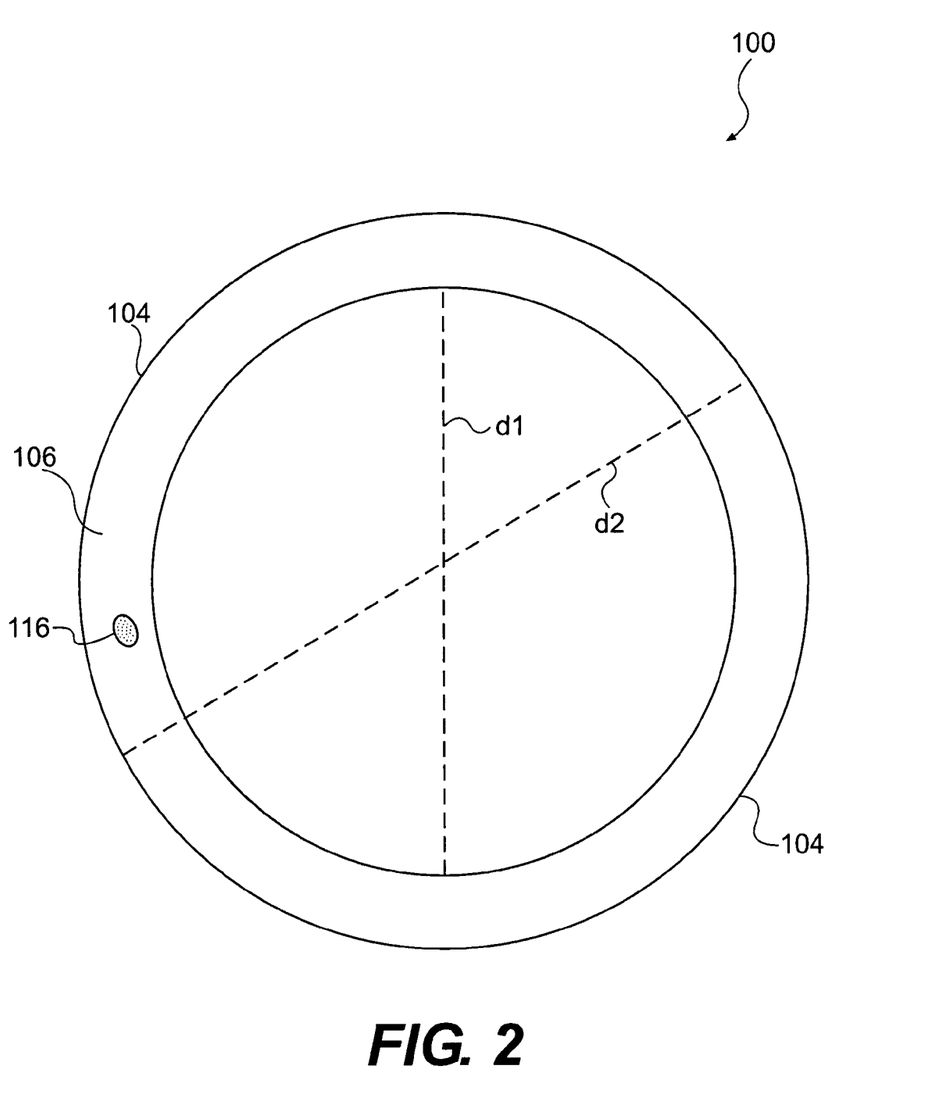
FIG. 2 is a top plan view of the container shown in FIG. 1.

Container 100 can include a solid bottom end 102, an outer sidewall 104, and neck portion 106 that forms an open end 108 of container 100. Outer sidewall 104 can extend from solid bottom end 102 and neck portion 106 can extend from outer sidewall 104. As shown in FIG. 2, neck portion 106 can have a diameter d1 that is less than a diameter d2 of outer sidewall 104. Additionally, sidewall 104 may have constant outer and inner diameters throughout the length of container 100. Sidewall 104 can also have a tapered portion connecting neck portion 106 to sidewall 104.

Figure 3:
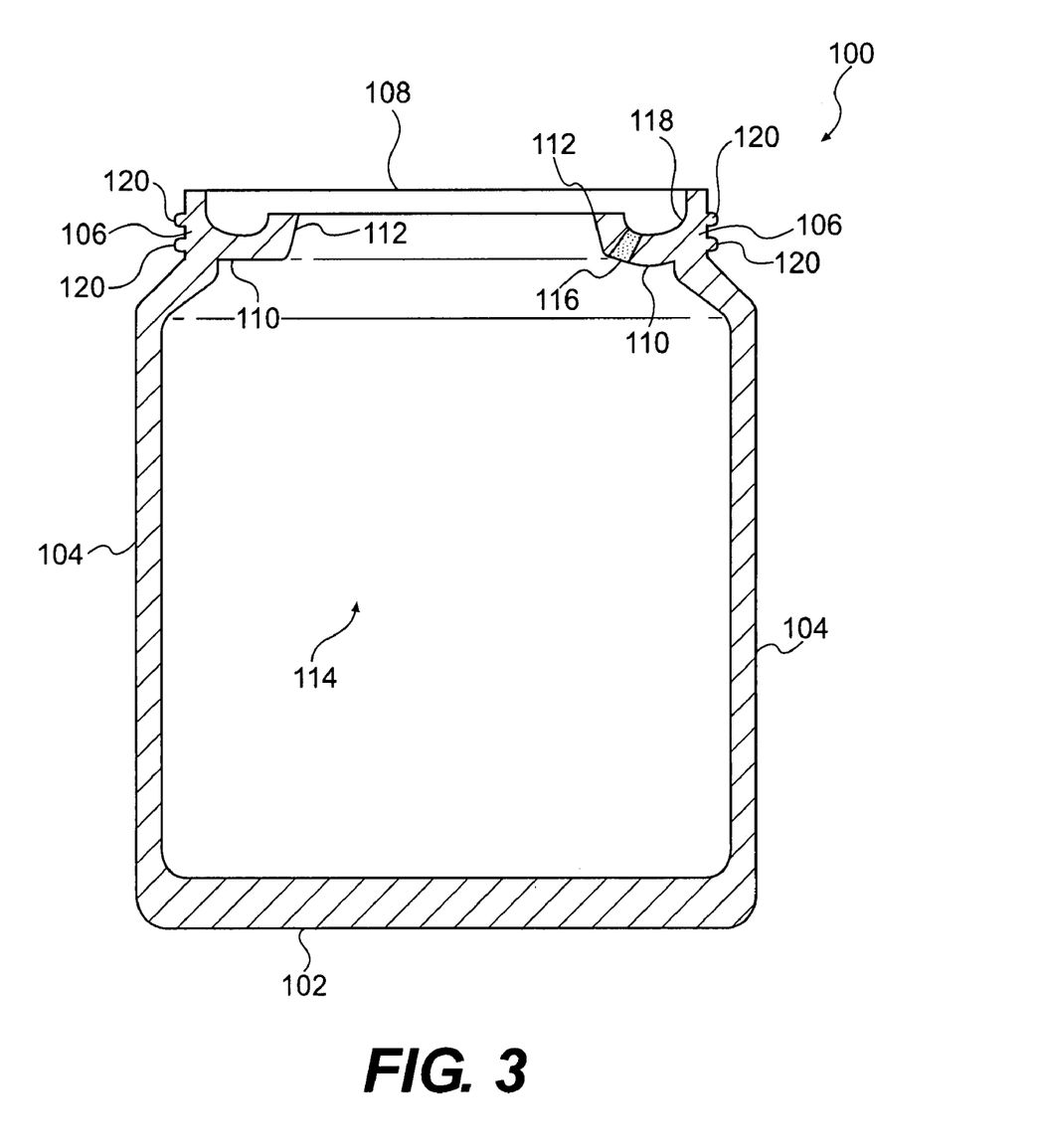
FIG. 3 is a cross-sectional view of the container shown in FIG. 1.

FIG. 3 shows a cross-sectional view of container 100. Container 100 can include a flange receptacle 110. Flange receptacle 110 can include a free end 112 and an aperture 116, and can extend inward from neck portion 106. In various embodiments, free end 112 may extend from neck portion 106 to a position below open end 108 of container 100. Moreover, flange receptacle 110 can be entirely contained within the interior of the container 114. Aperture 116 can be any suitable shape or size and can be configured at any suitable location in flange receptacle 110. For example, aperture 116 can have a substantially cylindrical shape and can be sized to allow for a product contained in container to pass through. In various embodiments, aperture 116 can be a drain hole formed from a blow needle hole used to blow the container. Aperture 116 used as a drain hole may allow, for example, paint to flow back into container 100.

In various embodiments, neck portion 106 can include one or more sealing ridge 120 formed on the outer diameter thereof. The one or more sealing ridge 120 can be any suitable sealing ridge of any suitable size and shape, including, but not limited to, threads, sealing beads, locking ridges, etc. Further, one or more sealing ridge 120 can be positioned at any suitable position on the outer diameter of neck portion 106. For example, in various embodiments, sealing ridge 120 is annular and can extend completely around the outer periphery of neck portion 106.

In various embodiments, flange receptacle 110 can include a concave portion 118 which can be formed between free end 112 and neck portion 106. In various embodiments, concave portion 118 can include aperture 116. Moreover, concave portion 118 can be formed so the concaved portion faces away from solid bottom end 102. Flange receptacle 110 may be configured to receive a product stored in container 100. In various embodiments, the product may travel through aperture 116 from concave portion 118 to the interior of the container 114. In this respect, a potential build up of product in flange receptacle 110 can be prevented, thereby ensuring a secure seal between container 100 and a closure, as will be discussed below.

Respective thicknesses of solid bottom end 102, outer sidewall 104, neck portion 106, and flange receptacle 112 can be any suitable thicknesses, including varying thicknesses. For example, the thickness of solid bottom end 102 can be thicker than one or more of outer sidewall 104, neck portion 106, and flange receptacle 112. Moreover, the thickness of solid bottom end 102 can be thicker at the edges of container 100 than at the center.

In various embodiments, container 100 can include a handle 122. Handle 122 can be any suitable size or shape and can be configured on container 100 at any suitable position and orientation. Moreover, handle 122 can be made of any suitable material, including, but not limited to, plastic, metal, etc. In various embodiments, handle 122 can be attached to an outside part of neck portion 106. In various embodiments, handle 122 may be formed separately from the container and can be coupled to the container after the container is formed. In another embodiment, handle 122 may be formed in one piece with the container. For example, handle 122 can be blow molded in one piece simultaneously with container 100.

Figure 4:
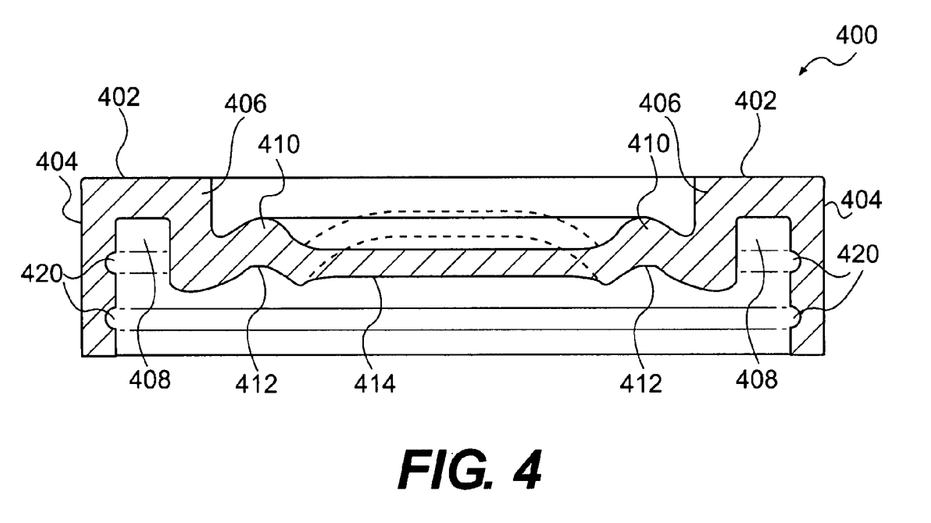
FIG. 4 is a cross-sectional view of a closure according to various embodiments.

FIG. 4 shows a cross-sectional view of a closure 400 according to various embodiments. Closure 400 can be any suitable size, shape, and configuration. For example, closure 400 may be substantially circular and have a substantially planar center region. In various embodiments, closure 400 can be configured to be secured to container 100, over open end 108. Additionally, closure 400 can comprise any suitable material. For example, closure 400 can comprise one or more plastics or combinations thereof, the plastics including, but not limited to, polyethylene terephthalate (PET), low density polyethylene (LDPE), high density polyethylene (HDPE), and nylons, as well as other polyesters, polyolefins, and polycarboxyamides having suitable properties for the intended application. Moreover, closure 400 can be made by any suitable process or method, including, but not limited to, blow molding, injection molding, extrusion blow molding, etc. U.S. Pat. No. 4,933,133 provides an example of a method of manufacture.

Closure 400 may include a sealing portion 402, a spring portion 410 that extends inward from sealing portion 402, and a planar center area 414 configured in the center of closure 400 and extending inward from spring portion 410. Sealing portion 402 can include an outer portion 404 and an inner portion 406 that form a first receptacle 408. In various embodiments, outer portion 404 has a diameter greater than the diameter of neck portion 106, and inner portion 406 has a diameter less than the diameter of neck portion 106. Additionally, in various embodiments, sealing portion 402 can include at least one recessed portion 420. The at least one recessed portion 420 can be any suitable size and configuration. In various embodiments, the at least one recessed portion 420 and the at least one sealing ridge 120 of container 100 may be configured to interconnect to create a secondary seal. For example, the at least one recessed portion 420 may include thread receptacles that are complementary to the at least one sealing ridge 120 (configured as a thread) of neck portion 106, which can allow for closure 400 to be threaded onto container 100.

Spring portion 410 can be formed in any suitable configuration. In various embodiments, spring portion 410 can surround planar center area 414. Additionally, spring portion 410 may be an annular formation that bends in one direction out of the plane defined by the center planar area 414 and then bends back. Moreover, in various embodiments, spring portion 410 may include a second receptacle 412. Second receptacle 412 can be any suitable shape and size. In various embodiments, second receptacle is an annular receptacle and concave shaped. Second receptacle 412 may be used to prevent spillage of product, such as paint, when a portion of a product in container 100 is placed on planar center area 414 of closure 400.

Figure 5:
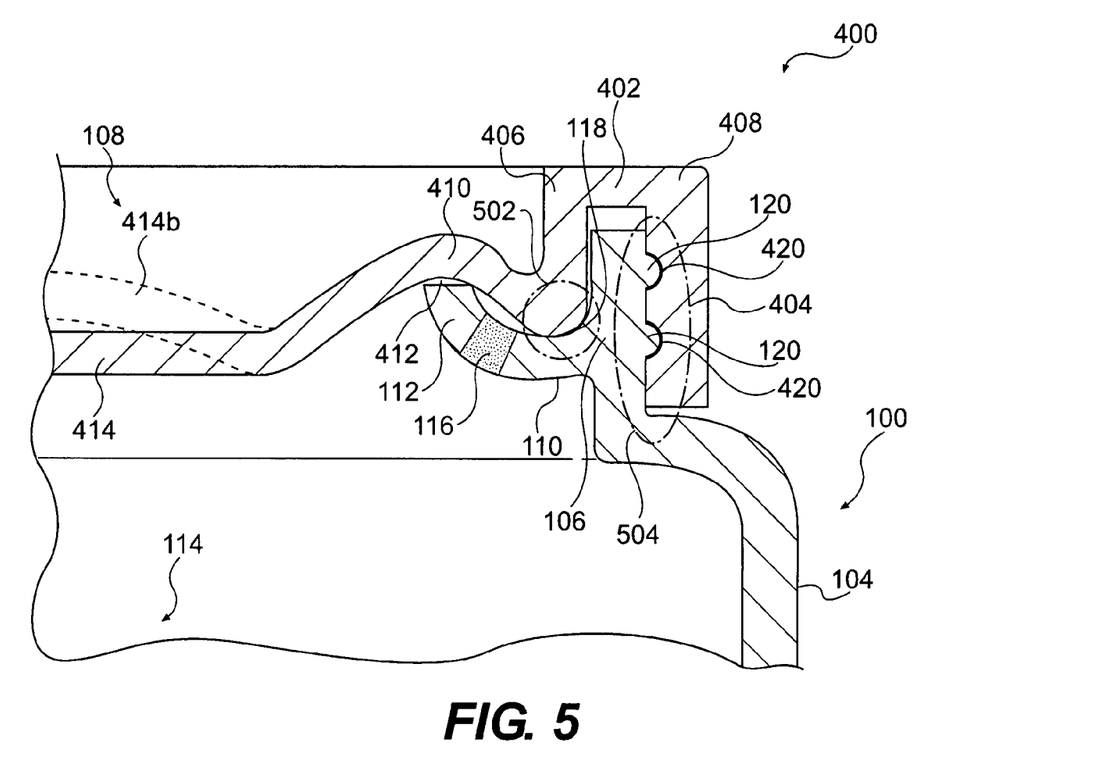
FIG. 5 is a cross-sectional view of the container and closure according to various embodiments.

FIG. 5 is a cross-sectional view of the container and closure according to various embodiments. As can be seen from FIG. 5, closure 400 is configured to be secured to container 100 over open end 108. In various embodiments, sealing portion 402 of closure 400 may be secured to neck portion 106 of container 100 so that the outer portion of closure 400 is located on the exterior side of neck portion 106 and the inner portion of closure 400 is located on the interior side of neck portion 106. Moreover, when closure 400 is secured to container 100, second receptacle 412 may face toward solid bottom end 102 of container 100.

When closure 400 is secured to container 100 a primary seal and a secondary seal may be created. More specifically, spring portion 410 may provide a radial biasing force for closure 400. For example, spring portion 410 may apply a constant pressure at all degrees to container 100. In various embodiments, spring portion 410 can apply a radial pressure to neck portion 106 to create a primary seal 502. More specifically, spring portion 410 can apply a force at an inner portion of neck portion 106, thereby acting to maintain contact between spring portion 410 and neck portion 106 and create primary seal 502 (circled in FIG. 5). In various embodiments, primary seal 502 prevents a product contained in container 100 from exiting the container. In various embodiments, secondary seal 504 can be formed between an exterior side of neck portion 106 and an outer portion of closure 404. For example, secondary seal 504 can be created by one or more sealing ridges 120 formed in neck portion 106 and corresponding one or more recessed portions 420 formed in sealing portion 402. In various embodiments, sealing ridges 120 can be threads and recessed portions 420 can be thread receptacles, whereby closure 400 is threaded onto container 100 to create the secondary seal.

Spring portion 410 can be formed to allow planar center area 414 to flex and take a concaved shape. In various embodiments, planar center area 414 can flex to position 414*b*, which shown by dashed lines in FIG. 5. The weight of planar center area 414 may cause planar center area 414 to flex and take a concaved shape. Additionally, a portion of a product may be placed on planar center area 414, with the weight of the product also contributing to cause planar center area 414 to flex and to a concaved shape. For example, closure 400 can be removed from container 100 and placed on a surface such that second receptacle 412 faces upward, thereby causing planar center area 414 to flex and take on a concave shape. That is to say, planar center area 414 can flex from the position shown in FIG. 5 by solid lines to a position indicated at 414*b*. Then, for example, a portion of a product, such as paint, which may be contained in container 100, can be placed on planar center area 414 that has since flexed to take on a concave shape. In various embodiments, planar center area 414 may flex due to the weight of the product placed therein. This may allow the planar center area 414 to be used as a paint "well" to contain the paint when closure 400 is removed and held or placed upright onto a substantially flat surface, which may allow the paint to be used away from container 100. Moreover, second receptacle 412 may serve as a receptacle to contain a product, such as paint, in the event that the product "overflows" from the concave planar center area 414.

In various embodiments, planar center area 414 may also act as a diaphragm to accommodate pressure changes caused by, for example, a change in elevation, changes in temperature, etc. More specifically, planar center area 414 may flex, due to a pressure change, to allow the rest of container 100 to retain its shape. For example, planar center area 414 may variously flex toward and away from solid bottom end 102 to allow sidewall 104 and/or solid bottom end 102 to retain their respective shapes.

Figure 6:
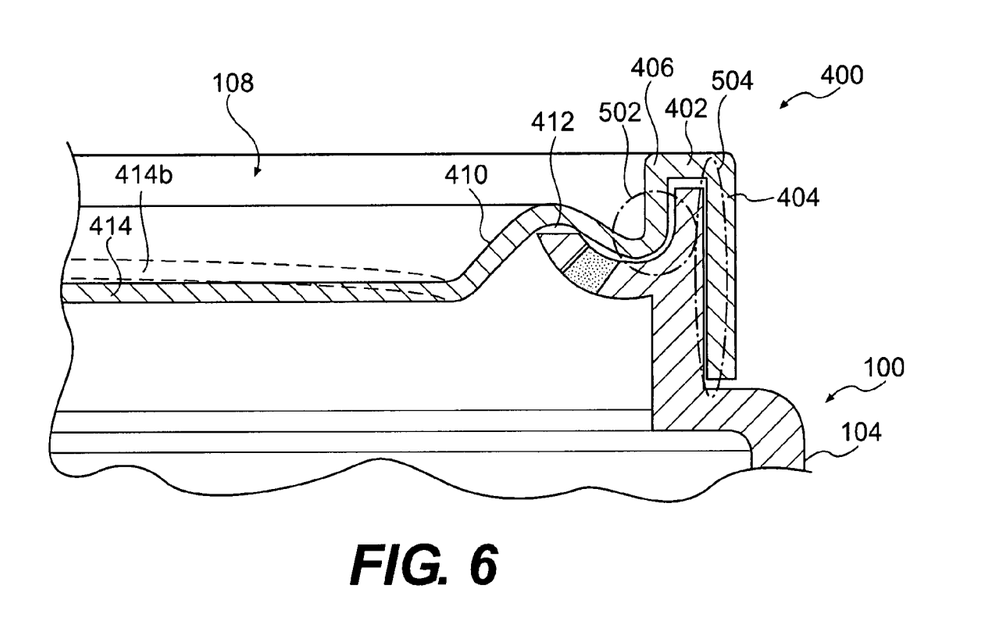
FIG. 6 is a cross-sectional view of the container and closure according to various embodiments.

FIG. 6 is a cross-sectional view of the container and closure according to various embodiments. As can be seen from FIG. 6, closure 400 is configured to be secured to container 100 over open end 108. In various embodiments, sealing portion 402 of closure 400 may be secured to neck portion 106 of container 100 so that the outer portion of closure 404 is located on the exterior side of neck portion 106 and the inner portion of closure 406 is located on the interior side of neck portion 106. Moreover, when closure 400 is secured to container 100, second receptacle 412 may face toward solid bottom end 102 of container 100. When closure 400 is secured to container 100 a primary seal and a secondary seal can be created. The primary seal 502 can be substantially the same as described with respect to FIG. 5 above. In FIG. 6, the secondary seal 504 can be created by the outer portion of closure 404 applying a force to the exterior side of neck portion 106.

FIG. 6 also shows spring portion 410 that can be formed to allow planar center area 414 to flex. In various embodiments, planar center area 414 can flex to a concaved shape. For example, planar center area 414 can flex to position 414b. Moreover, second receptable 412 may serve as a receptacle to contain a product, such as paint, in the event that the product "overflows" from the concave planar center area 414. In various embodiments, planar center area 414 may also act as a diaphragm to accommodate pressure changes (internal or external) caused by, for example, a change in elevation, changes in temperature, etc. More specifically, planar center area 414 may flex, due to a pressure change, to allow container 100 to retain its shape. For example, planar center area 414 may flex toward and away from solid bottom end 102 to allow sidewall 104 and/or solid bottom end 102 to retain their respective shapes.

Figure 7:
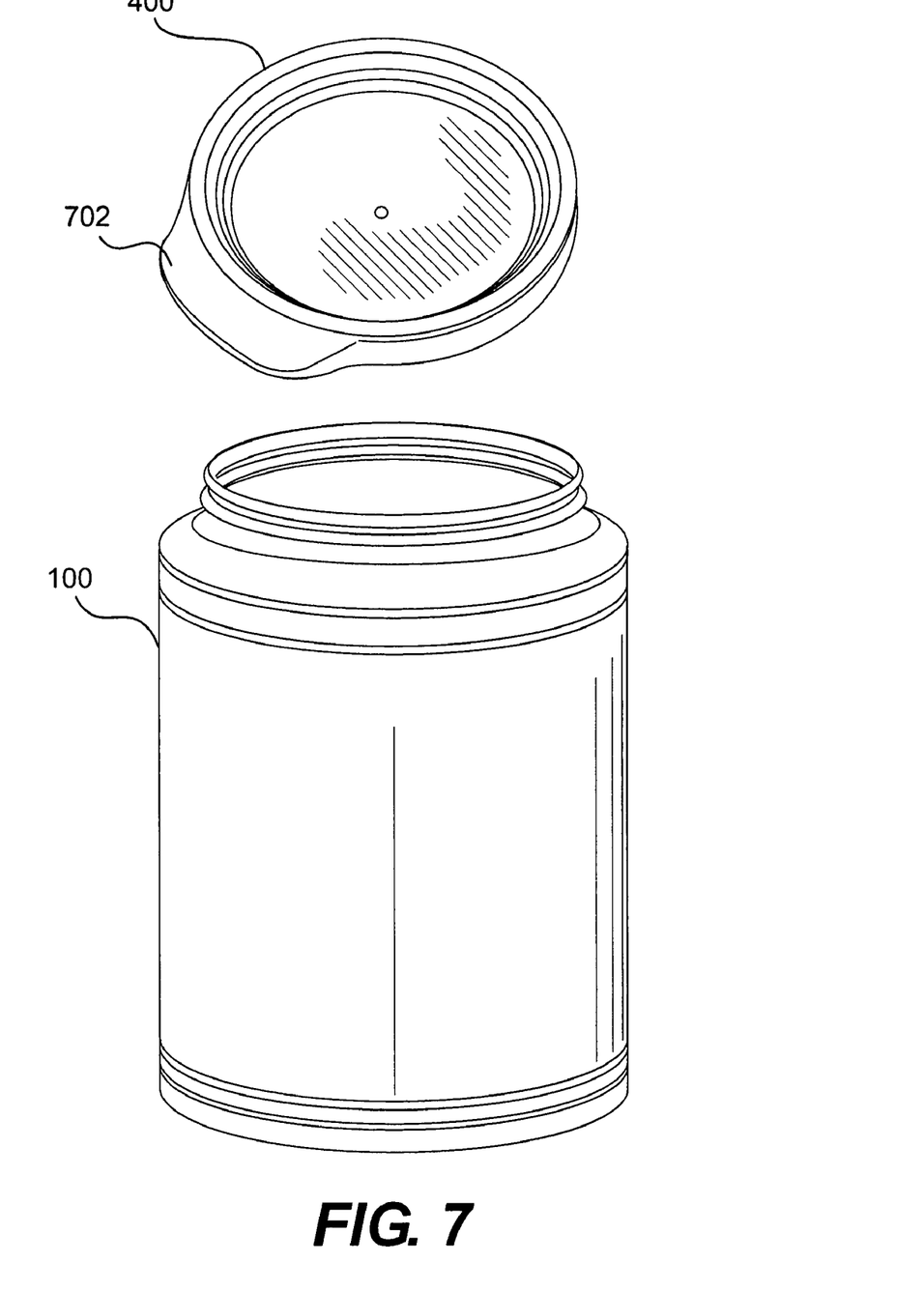
FIG. 7 is an elevation view a container and closure according to various embodiments.
Figure 8:
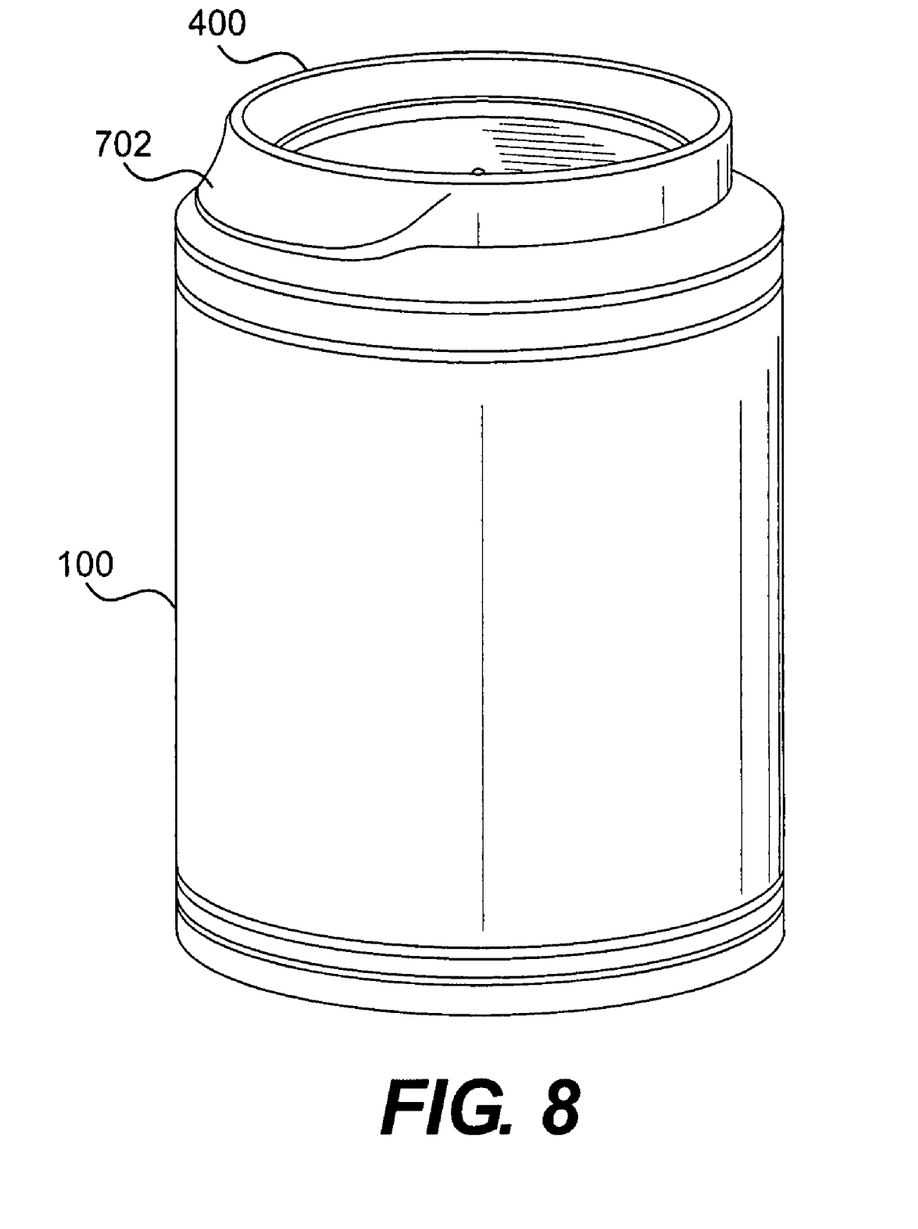
FIG. 8 is an elevation view of a container and closure according to various embodiments.

FIGS. 7 and 8 are elevation views of a container and a closure according to various embodiments. FIG. 7 shows the closure being unsecured to the container. FIG. 8 shows the closure being secured to the container. Both FIGS. 7 and 8 show that the closure can be configured with a tab portion 702. Tab portion 702 can be any suitable size and shape, and may be configured at any suitable position on closure 400. Moreover, tab portion 702 may be of any suitable configuration such that a force can be applied thereto to allow removal of closure 400 from container 100. For example, tab portion 702 may allow a pressure to be applied thereto to remove closure 400 from container 100. In various embodiments, the pressure may be an upward pressure to tab portion 702 to remove closure 400 from container 100. As another example, if the container and closure are secured together by threads and thread receptacles, a force may be applied to tab portion 702 from a side of tab portion 702 to allow closure 400 to be "unscrewed."

Figure 9:
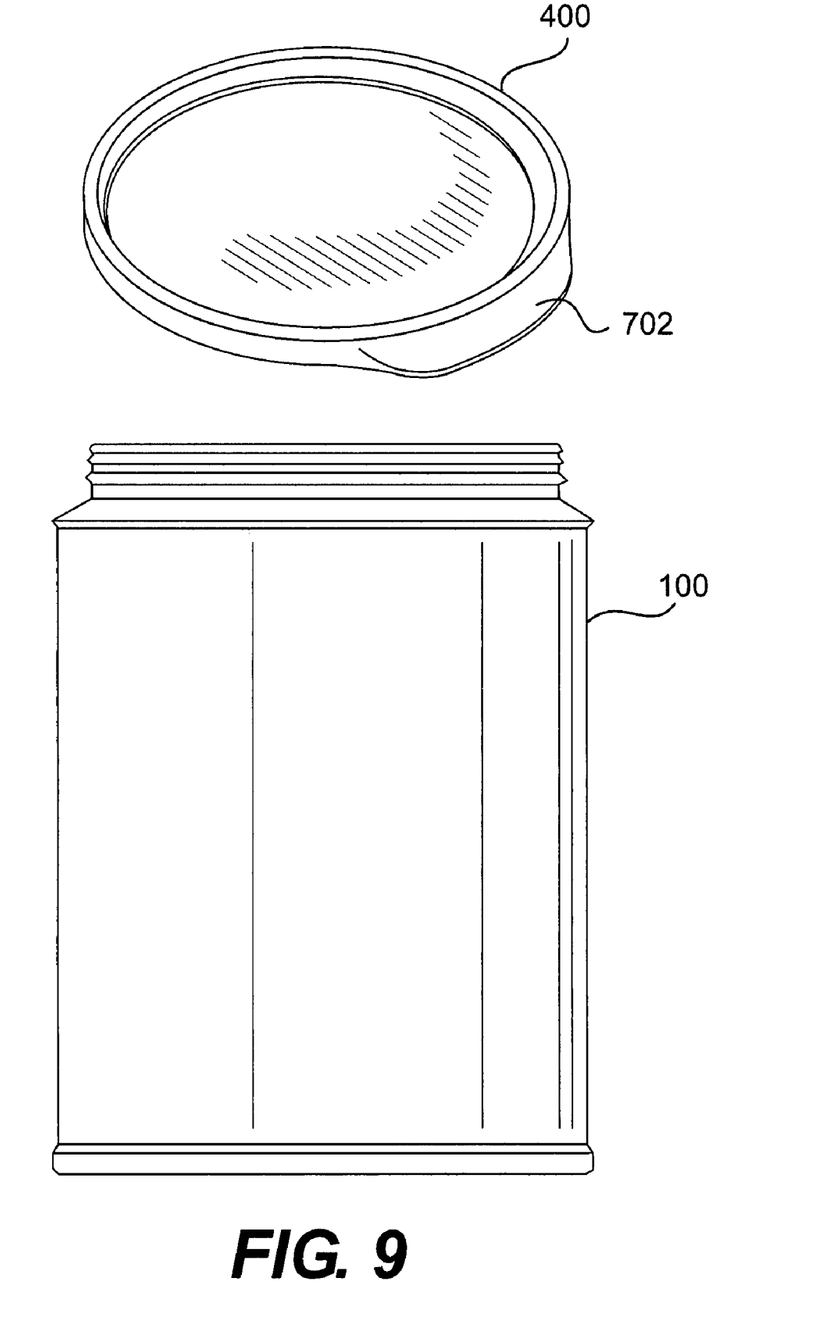
FIG. 9 is a side view of a container and closure according to various embodiments.
Figure 10:
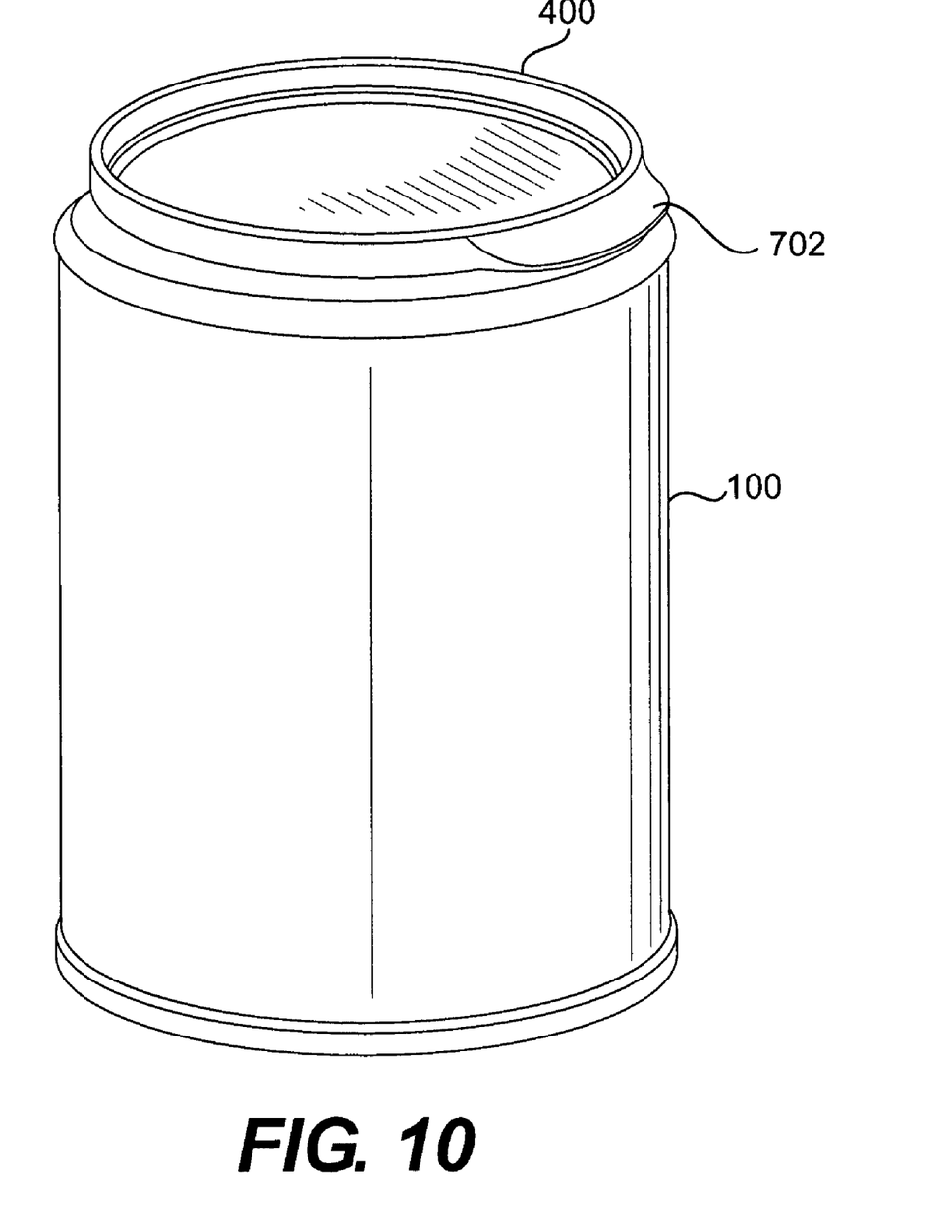
FIG. 10 is an elevation view of a container and closure according to various embodiments.

FIGS. 9 and 10 are side and elevation views, respectively, of a container and closure according to various embodiments. FIG. 9 shows the closure being unsecured to the container. FIG. 10 shows the closure being secured to the container. Both FIGS. 9 and 10 show that the closure can be configured with a tab portion 702. Tab portion 702 can be any suitable size and shape, and may be configured at any suitable position on closure 400. Moreover, tab portion 702 may be of any suitable configuration such that a force can be applied thereto to allow removal of closure 400 from container 100. For example, tab portion 702 may allow a pressure to be applied thereto to remove closure 400 from container 100. In various embodiments, the pressure may be an upward pressure to tab portion 702 to remove closure 400 from container 100. As another example, if the container and closure are secured together by threads and thread receptacles, a force may be applied to tab portion 702 from a side of tab portion 702 to allow closure 400 to be "unscrewed."

Figure 11:
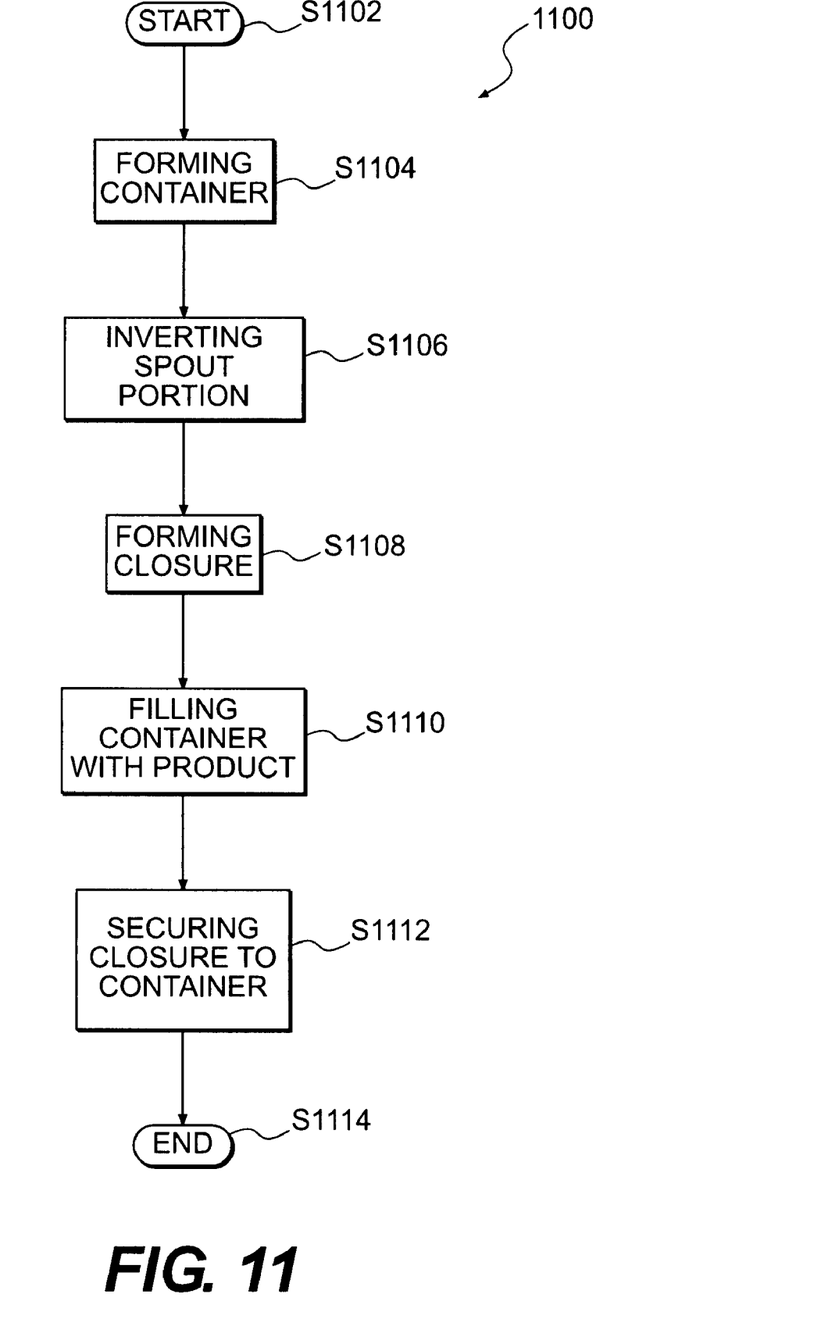
FIG. 11 is a flow chart of a method for forming a container and closure according to various embodiments.
Figure 12:
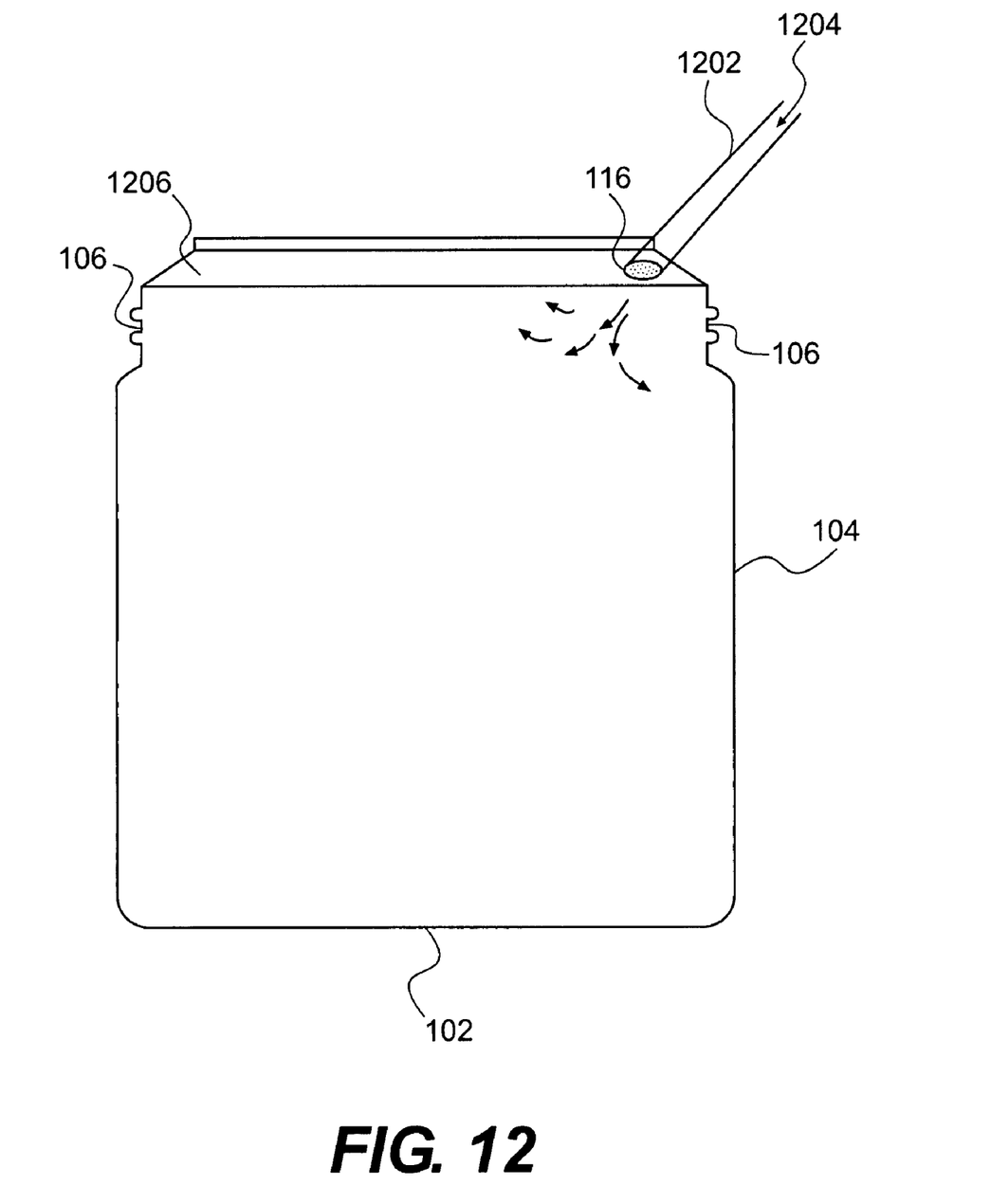
FIG. 12 is a side view of a container, as blown, according to various embodiments.

FIG. 11 is a flow chart of a method 1100 for forming a container and closure according to various embodiments. Method 1100 begins at S1102 and may proceed to S1104, where container 100 is formed. As discussed above, container 100 can be any suitable size and/or shape and can be made from any suitable material. In various embodiments, container 100 can be made from plastic. At S1104, container 100 can be formed by any suitable method or process, including, but not limited to, blow molding, injection molding, and extrusion blow molding. In various embodiments, container 100 can be formed by forcing a gas into the interior of the container 114. The gas may be any suitable gas, including, but not limited to, air, nitrogen, etc. The gas can be forced into the interior of the container 114 by any suitable means and at any suitable force. Turning to FIG. 12, container 100 can be formed such that neck portion 106 includes a spout portion 1206. In various embodiments, spout portion 1206 can include aperture 116. Aperture 116 can be used to allow forced gas 1004 into container 100 using any suitable means. In various embodiments, a blow needle 1202 can be used to force gas 1204 into container 100 via aperture 116.

Turning back to FIG. 11, the method may proceed from S1104 to S1106. At S1106, spout portion 1206 can be inverted. Spout portion 1206 can be inverted by any suitable means and in any suitable number of steps or movements. For example, spout portion 1206 can be inverted to form flange receptacle 110, as shown in FIG. 3. In various embodiments, spout portion 1206 can be forced downward, by any suitable means, toward the interior of container 114. Then, in various embodiments, the end of spout portion 1206 can be forced upward to form flange receptacle 110. Alternatively, spout portion 1206 can be held in place by any suitable means and container 100 pushed toward spout portion 1006, using any suitable means, so that spout portion 1206 is inverted. After pushing container 100 toward spout portion 1206 to invert spout portion 1206, container 100 can be moved in the opposite direction to form, for example, flange receptacle 110, as shown in FIG. 3.

Figure 13A:
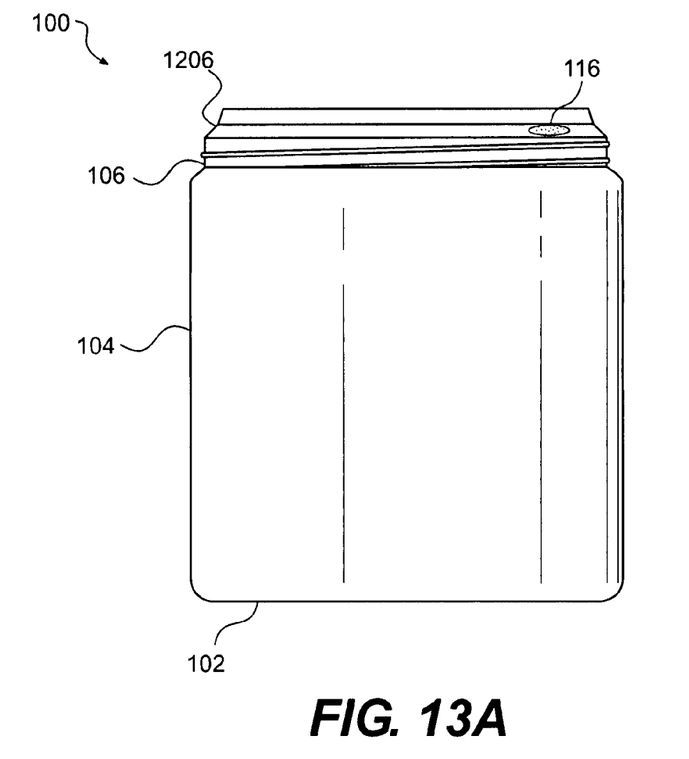
FIG. 13A is a side view of a container as blown.
Figure 13B:
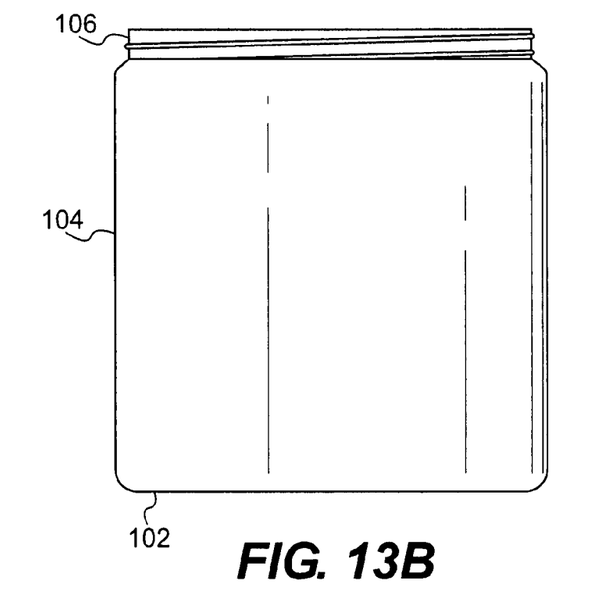
FIG. 13B is a side view of the container after inverting a spout portion.

FIG. 13A shows a side view of container 100 as blown and FIG. 13B shows a side view of container 100 after inverting spout portion 1206. As can be seen in FIG. 13A, container 100, as blown, includes neck portion 106 and spout portion 1206. In various embodiments, spout portion 1206 can include aperture 116. As noted above, aperture 116 can be used to allow a gas to be forced into container 100 to form the container. In various embodiments, aperture 116 is a blow needle hole of any suitable size and shape and can be positioned at any suitable location on spout portion 1206. FIG. 13B shows the container 100 after spout portion 1206 has been inverted. As can be seen, spout portion 1206 has been inverted such that aperture 116 is below upper-most portion of neck portion 106 that forms open end 108.

After S1106, the method may proceed to S1108, wherein closure 400 is formed. Alternatively, closure 400 can be formed before container 100 is formed or simultaneously with container 100. As discussed above, closure 400 can be formed by any suitable process and can be configured to be secured to open end 108 of container 100.

After S1108, the method may proceed to S1110 where container 100 is filled with a product by any suitable means. Container can be filled with any suitable product, including, but not limited to, paint, etc. In various embodiments, the product can be filled "hot" (above room temperature), "cold" (below room temperature), or at room temperature. For example, container 100 can be filled with paint, wherein the paint can be at a temperature of, for example, about 100 degrees Fahrenheit to about 110 degrees Fahrenheit.

From S1110, the method may proceed to S1112 where closure 400 is secured over the open end of the container 108. In various embodiments, when closure 400 is secured to container 100, over the open end 108, the closure creates a primary seal 502 and a secondary seal 504. The primary and secondary seals can substantially prevent the product from exiting container 100. In various embodiments, the primary seal, alone, can prevent the product from exiting container 100. The method may then proceed to S1114 where the method ends.

Though FIG. 11 shows a step of filling the container with a product preceding a step of securing a closure to a container over the open end of the container, the closure may be secured to the closure, and subsequently removed, before filling the container with a product. For example, the container and closure may be formed and secured together without filling the container with a product. The container may then be sent to a facility where the closure is removed, the container is filled with a product, and the closure is re-secured to the container over the open end of the container.

While the present invention has been described in conjunction with a number of embodiments, the invention is not to be limited to the description of the embodiments contained herein, but rather is defined by the claims appended hereto and their equivalents. It is further evident that many alternatives, modifications, and variations would be or are apparent to those of ordinary skill in the applicable arts. Accordingly, all such alternatives, modifications, equivalents, and variations that are within the spirit and scope of this invention.

What is claimed is:

1. A leak-resistant plastic container and closure combination comprising:
   a container comprising:
      a solid bottom end;
      an outer sidewall extending from the solid bottom end;
      a neck portion extending from the outer sidewall to create an open end of the container, the neck portion having a diameter less than a diameter of the outer sidewall; and
      a flange receptacle including a free end, the flange receptacle extending radially inward from the neck portion to a position below the open end of the container, the flange receptacle being entirely contained within the interior of the container and having an aperture formed therein; and
   a closure comprising:
      a sealing portion including an outer portion and an inner portion that form a first receptacle, the outer portion having a diameter greater than the diameter of the neck portion of the container and the inner portion having a diameter less than the diameter of the neck portion of the container;
      a spring portion including a second receptacle, the spring portion extending inward from the sealing portion; and
      a flexible planar center area in the center of the closure and extending inward from the spring portion, and configured to act as a diaphragm to accommodate pressure changes;
   wherein the neck portion of the container includes threads, the outer portion of the closure includes thread receptacles, and the closure is configured to be threaded onto the container, over the open end, using the threads and thread receptacles, to create a primary seal and a secondary seal, the threads and thread receptacles creating the secondary seal; and
   wherein when the closure is secured to the container, the spring portion exerts a sealing pressure against an interior side of the neck portion of the container to create the primary seal, the second receptacle faces toward the solid bottom end of the container, and the neck portion of the container is disposed within the first receptacle of the sealing portion of the closure.

2. The container and closure according to claim 1, wherein the sealing portion of the closure is configured to be secured to the neck portion of the container so that the outer portion of the closure is located on the exterior side of the neck portion and the inner portion of the closure is located on the interior side of the neck portion.

3. The container and closure according to claim 1, wherein the outer portion of the sealing portion exerts a sealing force against an exterior side of the neck portion of the container to create the secondary seal.

4. The container and closure according to claim 1,
   wherein the flange receptacle is configured to receive a product stored in the container, and
   the aperture is configured to allow the product received by the flange receptacle to be transferred, from a first side of the aperture, through the aperture, to a second side of the aperture.

5. The container and closure according to claim 1, wherein the closure further comprises a tab portion formed thereon, the tab portion being configured to allow a force to be applied thereto to remove the closure from the container.

6. The container and closure according to claim 1, wherein a handle is blow-molded simultaneously with the container.

* * * * *